United States Patent
Li (10) Patent No.: US 10,500,761 B2
(45) Date of Patent: Dec. 10, 2019

(54) METHOD TO IMPROVE SURFACE FINISH OF GLASS FIBER MAT

(71) Applicant: United States Gypsum Company, Chicago, IL (US)

(72) Inventor: Alfred Li, Naperville, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 809 days.

(21) Appl. No.: 14/467,257

(22) Filed: Aug. 25, 2014

(65) Prior Publication Data

US 2016/0052168 A1   Feb. 25, 2016

(51) Int. Cl.
| | |
|---|---|
| *B28B 19/00* | (2006.01) |
| *B32B 13/14* | (2006.01) |
| *B29B 15/12* | (2006.01) |
| *B29K 309/08* | (2006.01) |
| *B29K 101/10* | (2006.01) |

(52) U.S. Cl.
CPC .......... *B28B 19/0092* (2013.01); *B32B 13/14* (2013.01); *B32B 2260/021* (2013.01); *B32B 2260/046* (2013.01); *B32B 2262/101* (2013.01); *B32B 2607/00* (2013.01)

(58) Field of Classification Search
CPC .............. B28B 19/0092; B29B 15/125; B29K 2101/10; B29K 2309/08; B32B 13/14; B32B 2260/021; B32B 2260/046; B32B 2262/101; B32B 2607/00
USPC ............................................ 428/469; 156/42
See application file for complete search history.

(56) References Cited

U.S. PATENT DOCUMENTS

| | | | |
|---|---|---|---|
| 4,233,358 | A | 11/1980 | Jones et al. |
| 4,784,897 | A | 11/1988 | Brands et al. |
| 4,948,647 | A | 8/1990 | Burkard |
| 5,772,846 | A | 6/1998 | Jaffee |
| 5,837,621 | A | 11/1998 | Kajander |
| 5,883,024 | A | 3/1999 | O'Haver-Smith et al. |
| 6,432,482 | B1 | 8/2002 | Jaffee et al. |
| 6,524,679 | B2 | 2/2003 | Hauber et al. |
| 6,579,413 | B1 | 6/2003 | Grove |
| 8,053,528 | B2 | 11/2011 | Shoemake |
| 8,084,378 | B2 | 12/2011 | Jaffee et al. |
| 8,128,767 | B2 | 3/2012 | Jaffee |
| 8,329,308 | B2 | 12/2012 | Liu et al. |
| 8,461,067 | B2 | 6/2013 | Smith et al. |

(Continued)

FOREIGN PATENT DOCUMENTS

| | | |
|---|---|---|
| EP | 2138530 | 12/2009 |
| EP | 2156931 | 2/2010 |
| GB | 2231308 | 11/1990 |

OTHER PUBLICATIONS

"Polymer Curing Technologies", vol. 32, No. 1, May/Jun. 2011, pp. 1-40.

(Continued)

*Primary Examiner* — Lynda Salvatore
(74) *Attorney, Agent, or Firm* — Greer, Burns & Crain, Ltd.; Pradip Sabu; Philip T. Petti (57) ABSTRACT

A durable, moisture-resistant gypsum product is provided with smooth furnish which comprises a laminated glass fiber mat in which glass fibers are compressed and cross-linked with a thermosetting polymeric resin. Methods for making these gypsum products and glass fiber mats are provided as well.

14 Claims, 5 Drawing Sheets

(56) References Cited

U.S. PATENT DOCUMENTS

| | | | |
|---|---|---|---|
| 2002/0187296 A1 | 12/2002 | Hauber et al. | |
| 2004/0142618 A1* | 7/2004 | Porter | B28B 19/0092 |
| | | | 442/266 |
| 2005/0112374 A1* | 5/2005 | Jaffee | D21H 13/40 |
| | | | 428/375 |
| 2005/0136241 A1 | 6/2005 | Kajander et al. | |
| 2005/0266225 A1 | 12/2005 | Currier et al. | |
| 2006/0240236 A1 | 10/2006 | Bland et al. | |
| 2007/0012414 A1 | 1/2007 | Kajander et al. | |
| 2007/0093159 A1 | 4/2007 | Kajander | |
| 2007/0197114 A1 | 8/2007 | Grove | |
| 2010/0143682 A1 | 6/2010 | Shake et al. | |
| 2011/0086214 A1 | 4/2011 | Rockwell | |
| 2016/0040427 A1* | 2/2016 | Li | B32B 37/10 |
| | | | 428/341 |

OTHER PUBLICATIONS

"A Broader Base for your Success", Polymer Dispersions for Fiber Bonding, Acrodur, pp. 1-6.

Acrodur—a Binder With Versatile Advantages, Polymer Dispersions for Fiber Bonding, Acrodur, pp. 1-4.

"Recommended Levels of Gypsum Board Finish" Cisca, GA214-10, pp. 1-4.

"Finishing and Decorating Glass-Mat Gypsum Panels", United States Gypsum Company, 2012, pp. 1-3.

* cited by examiner

METHOD TO IMPROVE SURFACE FINISH OF GLASS FIBER MAT

CROSS-REFERENCE TO RELATED APPLICATIONS

This patent application relates to U.S. patent application Ser. No. 14/451,817, now U.S. Pat. No. 9,840,843 the entire disclosure of which is incorporated herein by reference.

FIELD OF THE INVENTION

This invention provides gypsum products with glass fiber mats and improved smooth surface finish such that the products are suitable for various interior applications. Methods for obtaining the products are provided as well.

BACKGROUND

Various gypsum products, including wall panels, ceiling panels and tiles, are commonly used in the construction industry. Many of these gypsum products are made by preparing an aqueous gypsum slurry with calcined gypsum (calcium sulfate alpha hemihydrate, calcium sulfate beta hemihydrate and/or calcium sulfate anhydrate), shaping the slurry and then allowing the slurry to harden by rehydrating calcined gypsum into gypsum (calcium sulfate dihydrate).

Gypsum panels can be manufactured by sandwiching a gypsum slurry between two cover sheets known as facers. In some applications, a facer is a paper sheet. Such wallboards in which a gypsum slurry is sandwiched between two sheets of paper find many different applications in building construction. However, wallboards may be sensitive to moisture and at least in some applications, other facer materials such as fibrous mats can be used as described for example in U.S. Pat. No. 8,329,308 and US Patent Publication 2010/0143682, both to the United States Gypsum Company, and the teachings of which are incorporated herein by reference. Suitable fibrous mats further include those disclosed in U.S. Pat. No. 5,772,846 and which are made with glass fibers and polyester fibers bound together.

US Patent Publication 2011/0086214 laminates one of the glass mat surfaces with a stiffening layer before the mat can be used in making a gypsum product. US Patent Publication 2002/0187296 discloses an assembly line on which a glass fiber mat is vibrated so that voids in the mat are more evenly filled with a gypsum slurry. U.S. Pat. No. 4,948,647 discloses gypsum products with a laminated composite facing of an outer nonwoven fiber mat and an inner woven fiber scrim bound together by an acrylic film. U.S. Pat. No. 6,524,679 discloses gypsum boards with face sheets comprising glass fibers and a combination of set gypsum and polymeric compound. Finally, U.S. Pat. No. 5,837,621 discloses glass fiber mats coated with at least one nitrogen containing compound.

Figure 1A:
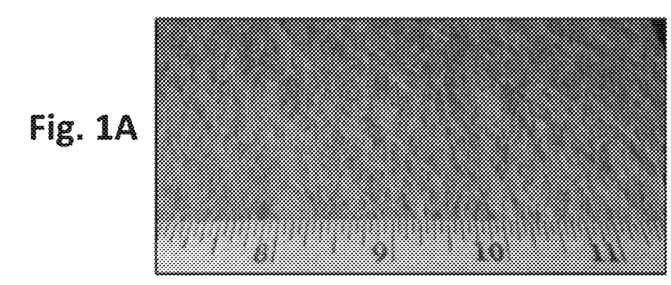
FIGS. 1A-1D are micrographs for a glass fiber mat (FIGS. 1A and 1B, where 1B is a larger magnification) and a gypsum board made with the glass fiber mat (FIGS. 1C and 1D, where 1D is a larger magnification).
Figure 1B:
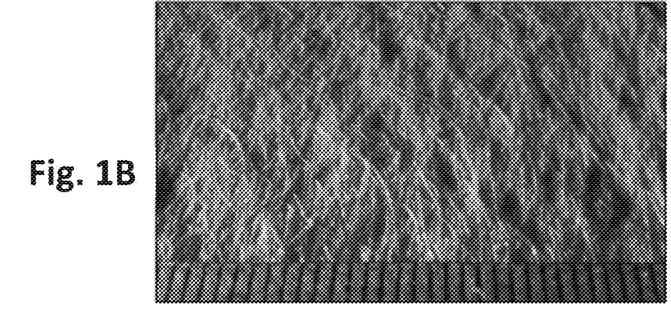
Figure 1C:
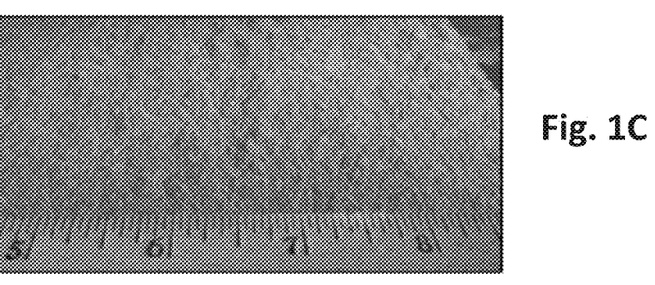
Figure 1D:
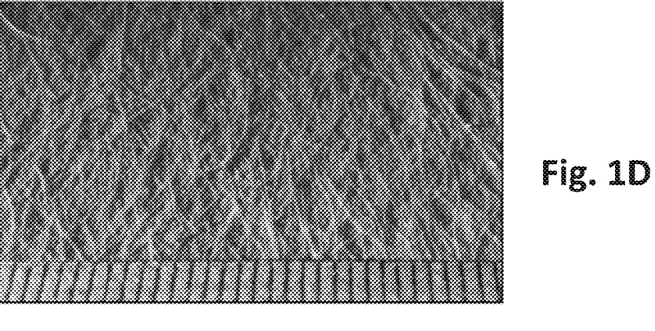

While gypsum panels made with glass fiber mats have many advantages, one of the disadvantages is the resulting boards may have a relatively rough surface. As shown in micrographs of FIGS. 1A-1B, with FIG. 1B being a micrograph with a larger magnification, the surface finish of a typical fiber glass mat made with 1 inch glass fibers can be characterized as rough. When this glass fiber mat is used for making gypsum boards, wrinkles develop during the curing stage and the local variations in the form of hills and valleys on the fiber glass mat can be easily seen on the board surface shown in FIGS. 1C and 1D, with 1D being a micrograph taken under a larger magnification. However, it is desirable, especially in connection with interior designs, to obtain gypsum boards with smooth surface.

SUMMARY OF THE INVENTION

This invention provides wallboards and other gypsum products made with glass fiber mats such that the resulting wallboard has a smooth surface. Methods for making these improved wallboards are provided as well.

One embodiment provides a gypsum product comprising a gypsum core sandwiched between at least one laminated glass fiber mat in which glass fibers are compressed and cross-linked with a thermosetting polymeric resin. Various thermosetting polymeric resins can be used, including a polyacrylate, polystyrene, polyester, polyethylene, polypropylene, polybutylene and mixtures thereof. Some embodiments provide a gypsum product which has a level 5 finish and which is made with a laminated glass fiber mat in which glass fibers are compressed and cross-linked with a polymeric resin.

Further embodiments provide methods for making a gypsum product, in which a glass fiber mat is soaked with a thermosetting polymeric resin and compressed by at least one of the following means: in a dry press, by a metering element, in a wet press, and by a calendar. The thermosetting polymeric resin in the glass fiber mat is then cured by heat. A gypsum slurry is then deposited onto the cured laminated glass fiber mat, and the gypsum product is allowed to set. In some embodiments, a glass fiber mat is pre-pressed before it is soaked with a thermosetting polymeric resin. The glass fiber mat can also be post-pressed after it is soaked with a thermosetting polymeric resin. The post-pressing can be accomplished with a metering element, by a wet press and/or by a calendar. The post-pressing can be accomplished before the thermosetting polymeric resin is fully cured. At least in some embodiment, the step of post-pressing takes place after the thermosetting polymeric resin is cured.

Further embodiments include methods for making a laminated glass fiber mat, in which a glass fiber mat is soaked in a thermosetting polymeric resin, compressed with a wet press; and cured in a dryer. At least in some further embodiments, the glass fiber mat is further pressed with a dry press before it is soaked in the thermosetting polymeric resin. The laminated glass fiber mat can be further calendared after the resin is cured or before the resin is fully cured.

DETAILED DESCRIPTION

The present invention provides gypsum products, including a gypsum wallboard, with improved smooth finish.

Methods for obtaining such products are provided as well. At least some embodiments provide gypsum wallboards made with glass fiber mats and which meet the requirements for a level 5 finish, the highest quality finish defined by the Gypsum Association in "Recommended levels of gypsum board finish." Further embodiments provide gypsum products made with glass fiber mats and suitable for various interior designs. One of the products is a gypsum wallboard, other products may include without any limitation, tiles, panels, partitions and the like. Further embodiments include improved fiber glass mats which can be used in a variety of cementitious and gypsum products where a smooth finish is desired. Such products include furniture, countertop covers, water-proof parts, windows, doors, sidings and the like.

A gypsum wallboard can be obtained by preparing a slurry comprising gypsum and then depositing the gypsum slurry onto a glass fiber mat. A second glass fiber mat can be used as a cover sheet. In alternative embodiments, paper can be used as the second cover sheet. In yet further embodiments, the gypsum slurry can be deposited onto a wire frame and covered with a glass fiber sheet A person of skill will further appreciate various other modifications in which a gypsum product is produced from a slurry comprising gypsum and at least one glass fiber mat.

Various glass fiber mats without limitations are suitable for making these gypsum products, including mats made with chopped glass fibers, continuous strand glass fibers, mats with random orientation of glass fibers and mixtures therefore.

At least in some embodiments, a glass fiber mat can be prepared from glass fibers which are bound together with at least one binder. Suitable binders include, but are not limited to, a styrene acrylic binder. At least in some embodiments, a glass fiber mat is formulated from glass fibers and a binder such that glass fibers comprise from about 50% to about 80% by weight of the mat and a binder comprises from about 10 to about 30% by weight of the mat One suitable glass fiber mat is the DuraGlass® 8924 Mat, manufactured by Johns Manville and made with about 70% of glass fibers and about 30% of an acrylic binder.

At least in some embodiments, a glass fiber mat can be formulated with fibers in a length of between about 0.5 to about 2.0 inches and a diameter of between about 6 and about 25 microns. At least in some embodiments, a glass fiber mat is formulated with biosoluble microfibers which have a diameter of about 3 microns. Biosoluble microfibers may comprise from 10% to 90% of all glass fibers. Some additional embodiments include those in which glass fibers with a preferred length of about 1 inch are used.

A glass fiber mat can optionally further comprise fillers, pigments, or other inert or active ingredients. For example, the mat can comprise at least one of a coloring pigment, biocide, fungicide, or mixtures thereof. Such additives can be useful to alter the coloration, modify the structure or texture of the surface, improve resistance to mold or fungus formation, and enhance fire resistance.

Suitable glass fiber mats include those which are laminated with a polymeric resin prior to their use for making gypsum products. Various resins can be used for laminating a glass fiber mat, including those described in U.S. patent application Ser. No. 14/451,817, the disclosure of which is incorporated herein in its entirety.

A glass fiber mat can be laminated with a water-soluble acrylic binder and then cured by thermosetting and/or with a chemical compound, referred to as a "hardener," which triggers a cross-linking reaction in the acrylic binder. Various thermoplastic polymers are suitable for laminating a glass fiber mat, including polyacrylate, polystyrene, polyester, polyethylene, polypropylene, polybutylene and mixtures thereof. Various curable water-soluble acrylic resins are suitable for this method. Such resins include thermocurable acrylo-polyester resins, including acrylo-polyester binders with hydroxyl functional groups. Acrylo-polyester binders can be prepared as aqueous solutions. Suitable aqueous solutions include solutions with 25 to 75% solids. Suitable aqueous solutions further include solutions with 50% solids. One suitable binder includes a thermosetting acrylo-polyester binder which forms an acrylo-polyester network when blended with hydroxyl-functional groups and exposed to heat, available from HB Fuller under the trade name NF4AD™. Other suitable binders include a system with non-formaldehyde, water-soluble modified polyacrylic acid and a polyalcohol crosslinker, available from BASF under the trade name ACRODUR™. Other suitable binders also include a non-formaldehyde, water-soluble, liquid polyalcohol resin binder, available from BASF under the trade name ARCLIN™ 7018.

Figure 2:
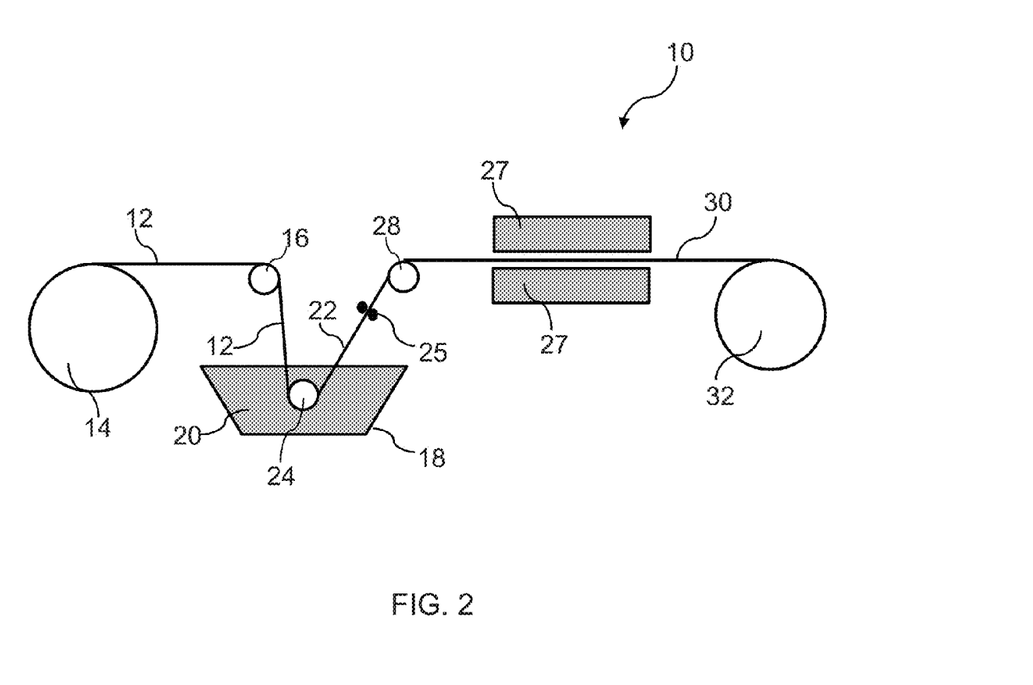
FIG. 2 is a schematic for a process in which a glass fiber mat is treated with a thermosetting polymeric resin.

Referring to FIG. 2, a process for laminating a glass fiber mat, generally 10, includes feeding an untreated glass fiber sheet 12 from a reel 14 with a rolling means 16 into a bath 18 filled with a polymeric resin 20 suitable for laminating a glass fiber sheet 12.

After the treatment with the resin 20 in the bath 18, a laminated glass fiber mat 22 is rolled out from the bath 18 with at least one rolling means 24 and metered with a metering element 25. The laminated glass fiber mat 22 is then fed into a dryer 27 with at a rolling means 28. After the resin 20 is cured on the glass fiber mat 22 in the dryer 27, the finished laminated glass fiber mat 30 is then rolled into a reel 32 or it can be cut into sheets of any length. A typical laminated glass fiber mat obtained by the process of FIG. 2 has many advantages such as it is durable and resistant to moisture, but the mat has an uneven, rough finish as can be seen from FIG. 5B.

Figure 3:
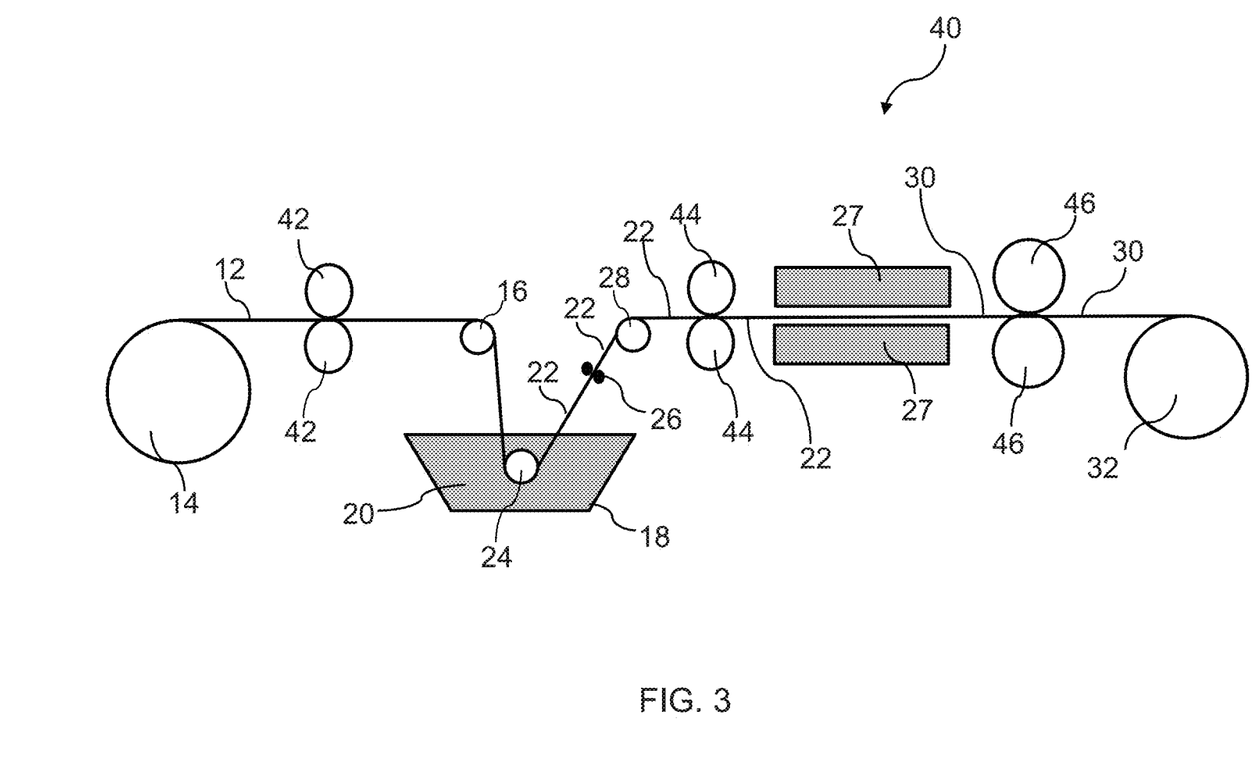
FIG. 3 is a schematic of a process for obtaining glass fiber sheets with the enhanced smooth surface finish.

Referring to FIG. 3, it provides one embodiment of a method, generally 40, for producing a glass fiber mat with smooth finish. A glass fiber mat 12 from a reel 14 is fed to a dry press 42 prior to be deposited into a resin bath 18 and be laminated with a polymeric resin 20. The dry-press 42 operates under ultra-low pressure, but this pressure is sufficient to densify glass fibers prior to saturation with the polymeric resin 20.

The polymeric resin 20 for laminating a glass fiber mat may include a polyacrylate, polystyrene, polyester, polyethylene, polypropylene, polybutylene and mixtures thereof. Various curable water-soluble acrylic resins are suitable for this method. Such resins include thermocurable acrylo-polyester resins, including acrylo-polyester binders with hydroxyl functional groups. Acrylo-polyester binders can be prepared as aqueous solutions. Suitable aqueous solutions include solutions with 25 to 75% solids. Suitable aqueous solutions further include solutions with 50% solids. One suitable binder includes a thermosetting acrylo-polyester binder which forms an acrylo-polyester network when blended with hydroxyl-functional groups and exposed to heat, available from HB Fuller under the trade name NF4AD™. Other suitable binders include a system with non-formaldehyde, water-soluble modified polyacrylic acid and a polyalcohol crosslinker, available from BASF under the trade name ACRODUR™. Other suitable binders also include a non-formaldehyde, water-soluble, liquid polyalcohol resin binder, available from BASF under the trade name ARCLIN™ 7018.

The dry press 42 is set to operate under the pressure sufficient to compress glass fibers. The nip pressure is a pressure between two rollers that are forced together. In some embodiments, the dry press 42 operates under the nip pressure higher than 5 psi, but lower than 100 psi. In other embodiments, the dry press 42 operates at the nip pressure in the range from 40 to 70 psi.

After the dry press 42, the glass fiber mat 12 is fed into a bath 18 with the polymeric resin 20 by at least one set of rolling means 16. After the treatment with the resin 20 in the bath 18, a laminated glass fiber mat 22 is rolled out from the bath 18 with at least one rolling means 24 and metered with a metering element 26. The metering element 26 may comprise a bent blade or wire-wound or smooth rod on the face and a wire-wound or smooth rod on the back to meter the excess resin 20. The inventor has discovered that the bent blade tends to make the surface smoother by filling the valleys in the fiber glass mat 22.

The laminated glass fiber mat 22 is then fed with at least one set of rolling means 28 into a wet press 44 which operates under low load. This permits controlling the caliper of the glass fiber mat 22. The wet press 44 is set to operate under the pressure sufficient to compress glass fibers. In some embodiments, the wet press 44 operates under the pressure higher than 5 psi, but less than 100 psi. In other embodiments, the wet press 44 operates at the pressure in the range from 40 to 70 psi.

After the wet press 44, the laminated glass fiber mat 22 is fed into a dryer 27 so that the polymeric resin 20 can be cured by heat. This cross-links glass fibers in the glass fiber mat 22. After the dryer 27, the cured laminated glass fiber mat 30 is fed into a calendar 46 which operates at a predetermined temperature and presses the cured laminated glass fiber mat 30 to achieve the target surface finish. At least in some embodiments, the calendar 46 operates at 400 to 500° F., depending on the line speed.

After the calendar 46, the cured laminated fiber glass mat is rolled into a reel 32 or the finished glass fiber mat 30 can be cut into sheets.

It will be appreciated that while FIG. 3 depicts one embodiment of a method for producing a laminated glass fiber mat with smooth finish, other embodiments may include methods in which only a dry press 42 is used, while steps with a wet press 44 and/or with a calendar 46 are omitted. Further modifications Include methods in which a dry press 42 and a wet press 44 are used, but no calendar 46 is used. Yet further methods include those in which at least one device selected from the dry press 42, metering element 26, wet press 44 and calendar 46 is used for compressing glass fibers. Further embodiments contemplate methods in which a laminated glass fiber mat 22 is first exposed to a calendar 46 and only after that the laminated glass fiber mat 22 is fed into a dryer 27 to cure the polymeric resin 20.

Figure 4:
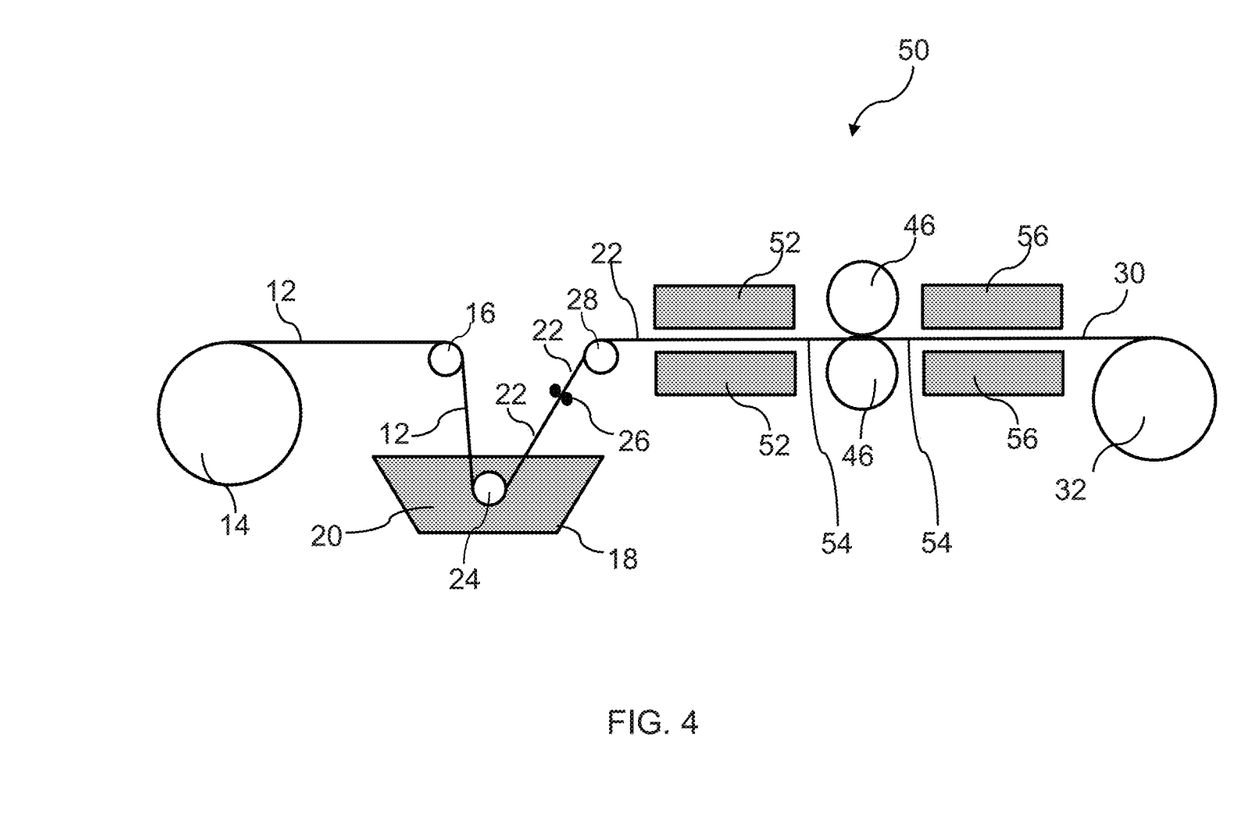
FIG. 4 is a schematic of an alternative process for obtaining glass fiber sheets with the enhanced smooth surface finish.

Referring to FIG. 4, it provides yet another method, generally 50, for obtaining a laminated glass fiber mat with smooth finish. In this method, a glass fiber mat 12 from a reel 14 is fed into a bath 18 with a polymeric resin 20 by at least one set of rolling means 16. After the treatment with the resin 20 in the bath 18, a laminated glass fiber mat 22 is rolled out from the bath 18 with at least one rolling means 24 and metered with a metering element 26. The metering element 26 may comprise a bent blade or wire-wound rod or smooth rod on the face and a wire-wound or smooth rod on back to meter the excess resin 20. The inventor has discovered that the bent blade tends to make the surface of the laminated glass fiber mat 22 smoother by filling the valleys in the glass fiber mat 22 with the resin 20.

The polymeric resin 20 for laminating a glass fiber mat may include a polyacrylate, polystyrene, polyester, polyethylene, polypropylene, polybutylene and mixtures thereof. Various curable water-soluble acrylic resins are suitable for this method. Such resins include thermocurable acrylo-polyester resins, including acrylo-polyester binders with hydroxyl functional groups. Acrylo-polyester binders can be prepared as aqueous solutions. Suitable aqueous solutions include solutions with 25 to 75% solids. Suitable aqueous solutions further include solutions with 50% solids. One suitable binder includes a thermosetting acrylo-polyester binder which forms an acrylo-polyester network when blended with hydroxyl-functional groups and exposed to heat, available from HB Fuller under the trade name NF4AD™. Other suitable binders include a system with non-formaldehyde, water-soluble modified polyacrylic acid and a polyalcohol crosslinker, available from BASF under the trade name ACRODUR™. Other suitable binders also include a non-formaldehyde, water-soluble, liquid polyalcohol resin binder, available from BASF under the trade name ARCLIN™ 7018.

The laminated glass fiber mat 22 is then fed with at least one set of rolling means 28 into a first dryer 52 which operates under first temperature $T_1$ and cures the polymeric resin 20 only by 40 to 50%. The partially cured laminated glass fiber mat 54 is then fed into a calendar 46 at a temperature higher than $T_1$ in order to press the partially cured laminated glass fiber mat 54 and achieve targeted surface finish. In some embodiments, the first dryer 52 operates under $T_1$ in the range from 220° F. to 300° F. After the calendar 46, the glass fiber mat 54 is fed into a second dryer 56 which operates at a second temperature $T_2$ sufficiently high to fully cure the polymeric resin 20 and cross-link with glass fibers. In some embodiments, the calendar 46 operates in the range at 300° F. to 360° F. and the second dryer 56 operates at the second temperature $T_2$ in the range 400° F. to 500° F. The fully cured laminated glass fiber mat 30 is then rolled into a reel 32 or cut into sheets. In some embodiments, temperatures in the first dryer 52, calendar 46 and the second dryer 56 are regulated based on the production line speed such that the shorter is a period of time that the laminated glass fiber mat spends in the first dryer 52, calendar 46 and the second dryer 56, the higher is the temperature to which the glass fiber mat is exposed. In many embodiments, the first dryer 52 operates in the temperature range from 220° F. to 300° F., and the calendar 46 operates in the temperature range from 300° F. to 360° F., while the second dryer 56 operates in the temperature range from 400° F. to 500° F.

Further modifications to the methods for obtaining a laminated glass fiber mat with smooth finish include those in which at least one of the following steps is performed. A glass fiber mat is pressed before it is soaked with a polymeric resin. A glass fiber mat is pressed after it is socked with a polymeric resin, but before the resin is cured. A laminated glass fiber mat is cured in a dryer and after that it is pressed and/or calendared. These various embodiments produce a laminated glass fiber mat in which glass fibers are compressed and cross-linked with a thermosetting polymeric resin. The laminated glass fiber mat is durable, resistant to moisture and has a smooth finish, which makes it suitable for interior designs in construction. While it was previously believed that compressing glass fibers would decrease the strength of the resulting glass fiber mat, unexpectedly, the resulting laminated glass fiber mat with compressed and cross-linked glass fibers affords excellent tensile strength, as was determined in a nail-pull test.

The laminated glass fiber mat obtained by any of the above-described methods has a smooth surface. In some embodiments, the laminated glass fiber mat meets requirements for the level 5 finish, which is the highest level defined by the Gypsum Association, as shown in the "Recommended levels of gypsum board finish" from the Gypsum Association.

Figure 5A:
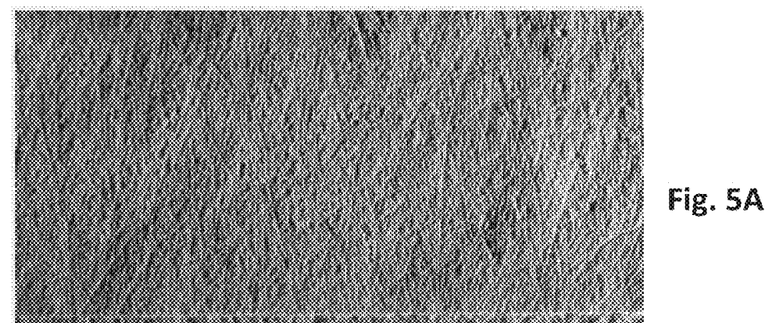
FIGS. 5A and 5B are comparative micrographs showing a glass fiber mat with smooth finish in FIG. 5A, and a control glass fiber mat which was not pre-pressed and post-pressed and which has a rough finish in FIG. 5B.
Figure 5B:
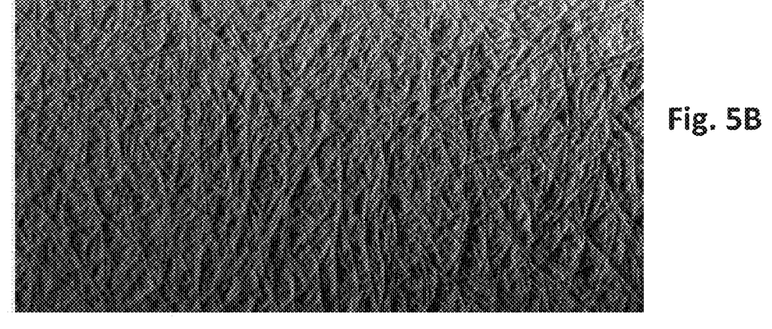

FIG. 5A is a micrograph of a laminated glass fiber mat in which glass fibers are compressed and cross-linked with a polymeric resin. This glass fiber mat was pre-pressed, laminated with a polymeric resin, dried and post-pressed by calendaring. FIG. 5B is a micrograph of a control glass fiber mat which was not treated by pre-press and post-press. It can be appreciated by comparing FIG. 5A to FIG. 5B, that a laminated glass fiber mat in FIG. 5A has a smooth surface, while a glass fiber mat in FIG. 5B has a rough surface. As can be appreciated from FIG. 5A, glass fibers in the laminated glass fiber mat are cross-linked with a polymeric resin and compressed, while the glass fibers in FIG. 5B are not compressed.

Further embodiments provide a laminated glass fiber mat with two sides, a face side and a back side. While the face side is smooth, the back side continues to be rough. Keeping the back side rough may be useful because this side is in contact with a gypsum slurry and it would adhere better to the gypsum slurry if some hills and valleys on the back side are left not compressed. At the same time, the face side of the laminated glass fiber mat is free of wrinkles and the resulting wallboard can be used in interior designs, including those in which level 5 finish is needed.

A laminated glass fiber mat with compressed and cross-linked glass fibers can be used for obtaining gypsum products which are moisture-resistant, but yet elastic, durable, pressure-resistant, and suitable as interior panels and in other applications because of their smooth surface.

Further embodiments provide a method for preparing a robust and durable gypsum product made with glass fiber mats described above. In this method, a glass fiber mat is first pressed with a roller, dry press or by other means which can apply pressure to the glass fibers, including as described in connection with FIG. 3. This step in the method is referred to as "the pre-pressing." The pressure applied at the "pre-prepressing" step may vary and it depends on the glass fiber mat used. In some embodiments, the applied pressure at the pre-pressing step is up to 60 psi. After the pre-pressing, the glass fiber mat is treated with a thermosetting acrylo-polyester resin and is pressed again. The second pressing step is referred to as "the post-pressing." The step of post-pressing can be performed with a roller, wet press, calendar or by any other means that apply sufficient pressure to the glass fibers in the glass fiber mat, including as described in connection with FIG. 4. The level of pressure applied at the post-pressing step depends on a particular glass fiber mat. In some embodiments, the pressure at the post-pressing step is applied up to 60 psi.

It will be appreciated that at least in some embodiments, the post-pressing step is applied before the polymeric resin is cured by heat, including as described in connection with FIG. 4. Further, while in some embodiments a glass fiber mat is prepared by pre-pressing, treating with a polymeric resin and post-pressing, in other embodiments the step of pre-pressing can be omitted. Yet in other embodiments, a glass fiber mat is prepared by pre-pressing and treating with a thermosetting polymeric resin, but the step of post-pressing is omitted. The steps of pre-pressing and/or post-pressing when combined with a step of laminating with a polymeric resin improve the surface finish of a gypsum product and reduce the amount of polymeric resin used.

In manufacturing of gypsum products, a gypsum slurry comprising calcined gypsum and water is prepared. The gypsum slurry may further comprise organic and/or inorganic fibers, at least one binder, cement, fillers, foam, defoamers, set retarders, set accelerators and plasticizers. Suitable organic and inorganic fibers include, but are not limited to, newspaper, wood chips, fiberglass and the like. Fillers include, but are not limited to, calcium carbonate, mica, clay and talk. Suitable binders include, but are not limited to, starch, acrylic binders and siloxane. Suitable plasticizers include, but are not limited to, naphthalene sulfate and polycarboxylates.

The gypsum slurry is then deposited on a first laminated glass fiber mat with smooth finish and which was obtained by soaking a glass fiber mat in a thermosetting polymeric resin and by pre-pressing, post-pressing or both, as described above. In some embodiments, a second glass fiber mat is then used to cover the gypsum slurry. In some embodiments, both glass fiber mats, the first and the second, are laminated glass fiber mats with smooth finish and which were obtained by soaking with a polymeric resin and pre-pressing, post-pressing or both, as described above. In other embodiments, only one of the two mats, either the first mat or the second mat, has a smooth finish, while the other mat has not being treated by pre-pressing, post-pressing or by both.

In some embodiments, a glass fiber mat has a front side and a back side, with the front side being smooth and the back side being rough. In these embodiments, the gypsum slurry is deposited on the back side of the glass fiber mat. In some embodiments, the glass fiber mat with smooth finish is completely cured and post-pressed before it is used for making a gypsum product. In other embodiments, the laminated glass fiber mat is combined with a gypsum slurry first, and then the laminated glass fiber mat is post-pressed.

While particular embodiments have been shown and described, it will be appreciated by those skilled in the art that changes and modifications may be made thereto without departing from the invention in its broader aspects and as set forth in the following claims.

What is claimed is:

1. A method for making a gypsum product, the method comprising:
    obtaining a glass fiber mat;
    laminating the glass fiber mat with a thermosetting polymeric resin by soaking the glass fiber mat in the thermosetting polymeric resin;
    partially curing the thermosetting polymeric resin;
    after the thermosetting polymeric resin is partially cured, but before the thermosetting polymeric resin is fully cured, compressing glass fibers in the glass fiber mat by at least one of the following means: in a wet press under a pressure in the range from 5 psi to 100 psi, and/or by a calendar;
    curing the thermosetting polymeric resin by exposing it to heat;
    preparing a gypsum slurry;
    depositing the gypsum slurry onto the cured laminated glass fiber mat; and
    letting the gypsum product set.

2. The method of claim 1, where the cured laminated glass fiber mat has a face side and a back side, and the back side is in contact with the gypsum slurry.

3. The method of claim 1, wherein glass fibers in the glass fiber mat are compressed to produce a level 5 finish for the gypsum product.

4. The method claim 2, wherein the fibers on the face side are compressed.

5. The method of claim 1, wherein the thermosetting polymeric resin is an acrylic binder.

6. The method of claim 1, wherein the gypsum slurry further comprises at least one of the following: foam, natural fibers, synthetic fibers, a defoamer, a plastisizer, a filler and a binder.

7. A method for making a laminated glass fiber mat, the method comprising:
   obtaining a glass fiber mat;
   soaking it in a thermosetting polymeric resin;
   partially curing the thermosetting polymeric resin;
   after the thermosetting polymeric resin is partially cured, but before the thermosetting polymeric resin is fully cured, compressing the fibers in the glass fiber mat with a wet press under the pressure in the range from 5 psi to 100 psi and/or by a calendar; and curing the laminated glass fiber mat in a dryer.

8. The method of claim 7, wherein the glass fiber mat is further pressed with a dry press before it is soaked.

9. The method of claim 7, wherein the glass fiber mat is further calendared after the resin is cured.

10. The method of claim 7, wherein the glass fiber mat is further calendared before the resin is fully cured.

11. The method of claim 7, wherein a calendar is used in place of a wet press and the resin is only partially cured with a first dryer before the calendaring step.

12. The method of claim 11, wherein the resin is cured to completion with a second dryer after the calendaring step.

13. The method of claim 1, wherein the thermosetting polymeric resin is selected from a polyacrylate, polystyrene, polyester, polyethylene, polypropylene, polybutylene and mixtures thereof.

14. The method of claim 1, wherein the step of compressing comprises applying a pressure of up to 60 psi.

* * * * *